United States Patent
Chang

(10) Patent No.: US 10,615,698 B2
(45) Date of Patent: Apr. 7, 2020

(54) RESONANT POWER CONVERTER AND CONTROL METHOD THEREOF

(71) Applicant: DELTA ELECTRONICS, INC., Taoyuan (TW)

(72) Inventor: Yu-Ming Chang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 14 days.

(21) Appl. No.: 15/802,462

(22) Filed: Nov. 3, 2017

(65) Prior Publication Data

US 2018/0301995 A1 Oct. 18, 2018

(30) Foreign Application Priority Data

Apr. 14, 2017 (CN) .......................... 2017 1 0245294

(51) Int. Cl.
*H02M 3/335* (2006.01)
*H02M 7/5387* (2007.01)
(Continued)

(52) U.S. Cl.
CPC ......... *H02M 3/33546* (2013.01); *H02M 1/10* (2013.01); *H02M 1/14* (2013.01);
(Continued)

(58) Field of Classification Search
CPC ......... H02M 3/33546; H02M 3/33507; H02M 3/33569; H02M 3/3376; H02M 1/10;
(Continued)

(56) References Cited

U.S. PATENT DOCUMENTS

| 4,758,940 A | * | 7/1988 | Steigerwald | ........ | H02M 3/3376 363/17 |
| 7,190,596 B2 | * | 3/2007 | Durbaum | .............. | H02M 1/083 363/16 |

(Continued)

FOREIGN PATENT DOCUMENTS

| CN | 105375779 A | 3/2016 |
| CN | 105610315 A | 5/2016 |
| TW | 201505348 A | 2/2015 |

*Primary Examiner* — Jue Zhang
*Assistant Examiner* — Jye-June Lee
(74) *Attorney, Agent, or Firm* — CKC & Partners Co., LLC

(57) ABSTRACT

A power converter includes a primary-side switching circuit, a resonant circuit, a transformer, a secondary-side rectifying circuit, and a processing circuit. The primary-side switching circuit includes switches and configured to switch the switches to be on or off based on a switching frequency to convert a dc input voltage to an AC signal. The resonant circuit is coupled to the primary-side switching circuit and configured to receive the AC signal to provide a resonant current. The primary winding of the transformer is coupled to the resonant circuit. The secondary-side rectifying circuit is coupled to the secondary winding of the transformer and configured to rectify the secondary ac signal output by the secondary winding and output an output voltage. The processing circuit receives a cut-off current detecting signal via a current detecting circuit if the corresponding switch is turned off, and adjusts the switching frequency accordingly.

17 Claims, 10 Drawing Sheets

(51) Int. Cl.
*H02M 1/10* (2006.01)
*H02M 1/14* (2006.01)
*H02M 1/44* (2007.01)
*H02M 3/337* (2006.01)
*H02M 1/00* (2006.01)
*H02M 7/48* (2007.01)

(52) U.S. Cl.
CPC ........... *H02M 1/44* (2013.01); *H02M 3/3376* (2013.01); *H02M 3/33507* (2013.01); *H02M 3/33569* (2013.01); *H02M 7/53871* (2013.01); *H02M 2001/0009* (2013.01); *H02M 2001/0058* (2013.01); *H02M 2007/4815* (2013.01); *Y02B 70/1433* (2013.01); *Y02B 70/1441* (2013.01)

(58) Field of Classification Search
CPC .. H02M 1/14; H02M 1/44; H02M 2001/0058; H02M 2007/4815; H02M 7/53871; H02M 3/3378; H02M 7/4807; Y02B 70/1433; Y02B 70/1441
See application file for complete search history.

(56) References Cited

U.S. PATENT DOCUMENTS

| | | | |
|---|---|---|---|
| 8,842,449 B1 | 9/2014 | Tong | |
| 2007/0070655 A1* | 3/2007 | Eguchi | H02M 1/10 363/17 |
| 2009/0251929 A1* | 10/2009 | Choi | H02M 3/3378 363/21.02 |
| 2014/0286056 A1* | 9/2014 | Yoon | H02M 3/33569 363/21.03 |
| 2015/0049518 A1* | 2/2015 | Harrison | H02M 7/4807 363/17 |
| 2016/0190946 A1* | 6/2016 | Fu | H02M 3/33546 363/21.02 |

* cited by examiner

RESONANT POWER CONVERTER AND CONTROL METHOD THEREOF

RELATED APPLICATIONS

This application claims priority to China Application Serial Number 201710245294.8, filed Apr. 14, 2017 which is herein incorporated by reference.

BACKGROUND

Technical Field

The present disclosure relates to a power converter, and in particular, to a resonant power converter.

Description of Related Art

A LLC resonant converter may provide a stable output voltage by frequency modulation. Recently, because being suitable for wide-range input voltage and large power output, the LLC resonant converter is widely applied in renewable energy power supply systems such as a solar PV (photovoltaic) system.

However, if the operating frequency of the LLC resonant converter is too high or too low, the switching loss and the conduction loss in a circuit often increase, thus increasing the overall system loss, and lowering the conversion efficiency. Therefore, an important area of research in the field involves ways in which to perform the frequency control of the LLC resonant converter so as to control the operating frequency to be close to an ideal operation point.

SUMMARY

One aspect of the present disclosure is a power converter. The power converter includes a primary-side switching circuit, a resonant circuit, a transformer, a secondary-side rectifying circuit and a processing circuit. The primary-side switching circuit includes a plurality of switches, in which the primary-side switching circuit is configured to switch the switches to be on or off based on a switching frequency to convert a dc input voltage to an ac signal. The resonant circuit is electrically coupled to the primary-side switching circuit and configured to receive the ac signal to provide a resonant current. A primary winding of the transformer is electrically coupled to the resonant circuit. The secondary-side rectifying circuit is electrically coupled to a secondary winding of the transformer and configured to rectify a secondary ac signal outputted by the secondary winding and output an output voltage. The processing circuit is configured to receive a cut-off current detecting signal via a current detecting circuit on the condition that the corresponding switch is turned off, and configured to adjust the switching frequency accordingly.

Another aspect of the present disclosure is a power converter. The power converter includes a primary-side switching circuit, a resonant circuit, a current detecting circuit, a transformer, a secondary-side rectifying circuit, and a processing circuit. The primary-side switching circuit includes a plurality of switches and the switches are configured to be turned on or off selectively according to a plurality of driving signals respectively to convert a dc input voltage to a ac signal. The resonant circuit is configured to receive the ac signal to provide a resonant current. The current detecting circuit is configured to detect the resonant current and output a current detecting signal according to the resonant current. The transformer includes a primary winding configured to receive a primary ac signal from the resonant circuit, and a secondary winding configured to output a secondary ac signal in response to the primary ac signal. The secondary-side rectifying circuit is configured to rectify the secondary ac signal and output an output voltage. The processing circuit is configured to control a switching frequency of the driving signals according to the current detecting signal on the condition that the corresponding switch is turned off by one of the driving signals.

Yet another aspect of the present disclosure is a power converter controlling method. The power converter controlling method includes outputting, by a driving circuit in a power converter, a driving signal to control a corresponding switch in a primary-side switching circuit, to switch an ac signal received by a resonant circuit in the power converter; detecting a resonant current flowing through a resonant circuit in the power converter by a current detecting circuit in the power converter to obtain a cut-off current detecting signal on the condition that the corresponding switch is turned off; and determining whether a switching frequency of the driving signal is adjusted to a resonant frequency of the resonant circuit according to the cut-off current detecting signal and adjusting the switching frequency selectively by a processing circuit in the power converter.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
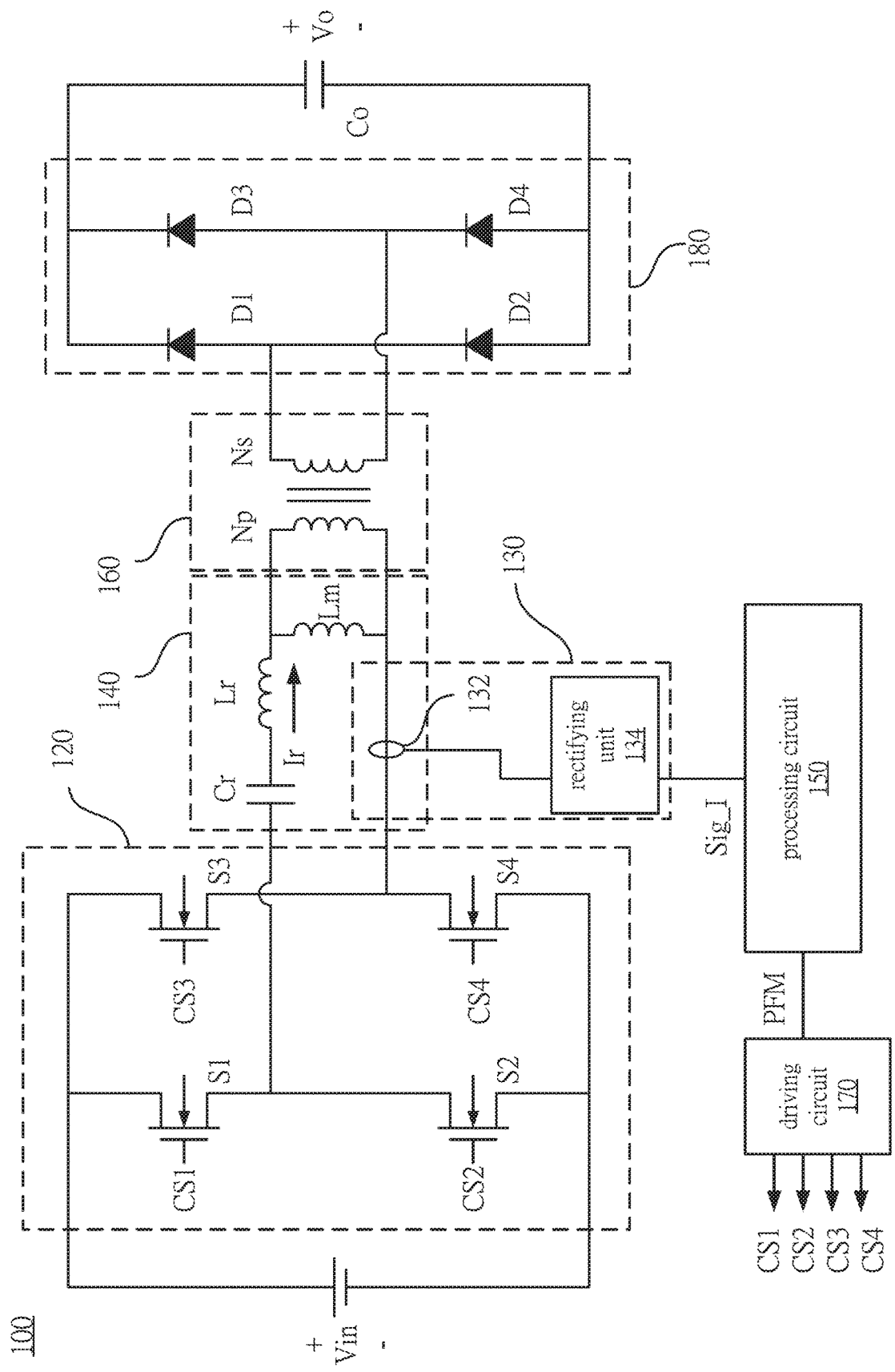
FIG. 1 is a schematic diagram illustrating a power converter according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a schematic diagram illustrating a power converter 100 according to some embodiments of the present disclosure. As shown in FIG. 1, in some embodiments, the power converter 100 includes a primary-side switching circuit 120, a resonant circuit 140, a transformer 160, a secondary-side rectifying circuit 180, a current detecting circuit 130, a processing circuit 150, and a driving circuit 170. In some embodiments, the power converter 100 may be applied to a DC-DC converter device in a solar PV system, so as to convert the DC voltage outputted by solar panels to a proper voltage level. Thus, an inverter at post stage may convert the DC power to an AC power which is in-phase with a power grid so as to connect renewable energy to the power grid.

An input side of the primary-side switching circuit 120 is electrically coupled to an input voltage source, and configured to receive a DC input voltage Vin. An output side of the primary-side switching circuit 120 is electrically coupled to an input side of the resonant circuit 140, and configured to output an AC signal to the resonant circuit 140. An output side of the resonant circuit 140 is electrically coupled to a primary winding Np of the transformer 160. A secondary winding Ns of the transformer 160 is electrically coupled to an input side of the secondary-side rectifying circuit 180. An output side of the secondary-side rectifying circuit 180 is electrically coupled to an output capacitor, in order to provide a DC output voltage Vo to a post-stage circuit. Therefore, the primary-side switching circuit 120, the resonant circuit 140, the transformer 160, and the secondary-side rectifying circuit 180 may form a circuit structure of a LLC resonant converter.

In addition, as depicted in FIG. 1, the current detecting circuit 130 is arranged on the circuit of the resonant circuit 140 to detect the resonant current Ir flowing through the resonant circuit 140. For example, the current detecting circuit 130 may include a current detecting unit 132 and a rectifying unit 134. In some embodiments, the current detecting unit 132 may be implemented by a current transformer, but the present disclosure is not limited thereto. The rectifying unit 134 is electrically coupled to the current detecting unit 132 and configured to rectify the detecting signal obtained by the current detecting unit 132, in order to output a current detecting signal Sig_I to indicate the resonant current Ir.

The processing circuit 150 is electrically coupled to the current detecting circuit 130. The driving circuit 170 is electrically coupled between the processing circuit 150 and the primary-side switching circuit 120. In some embodiments, the processing circuit 150 may include a voltage-controlled oscillator (VCO) configured to generate a pulse frequency modulation (PFM) signal PFM to the driving circuit 170 according to the current detecting signal Sig_I. After receiving the pulse frequency modulation signal PFM from the processing circuit 150, the driving circuit 170 may output multiple driving signals CS1-CS4 respectively to the switches S1-S4 in the primary-side switching circuit 120 according to the pulse frequency modulation signal PFM, so as to switch the switches S1-S4 to be on or off based on a switching frequency of the driving signals CS1-CS4. Thus, the processing circuit 150 may change the switching frequency of the AC signal that is outputted by the primary-side switching circuit 120 by using the pulse frequency modulation signal PFM. In some embodiments, the voltage-controlled oscillator (VCO) in the processing circuit 150 may be implemented by cooperation of various circuits such as an integrator and a comparator, and further detailed explanation is not described again herein for the sake of brevity.

Accordingly, as the switching frequency of the AC signal outputted by the primary-side switching circuit 120 is changed, the impedance of the resonant circuit 140 is changed in response to the switching frequency. Therefore, the induced voltage in the primary winding Np of the transformer 160 varies as the switching frequency varies, and the corresponding DC output voltage Vo is outputted via the secondary winding Ns and the secondary-side rectifying circuit 180 at the secondary side. Alternatively stated, the DC output voltage Vo may be controlled by the switching frequencies of the driving signals CS1-CS4.

Specifically, in various embodiments, the primary-side switching circuit 120 may be implemented by a half-bridge, a full bridge, or another type of switching circuit. For example, in the embodiment shown in FIG. 1, the primary-side switching circuit 120 may be implemented by a full bridge circuit. The primary-side switching circuit 120 includes switches S1, S2, S3, and S4. As depicted in the drawing, a first terminal of the switch S1 is electrically coupled to a positive terminal of the input voltage source. A second terminal of the switch S1 is electrically coupled to the first terminal of the resonant circuit 140. A first terminal of the switch S2 is electrically coupled to the first terminal of the resonant circuit 140. A second terminal of the switch S2 is electrically coupled to a negative terminal of the input voltage source. A first terminal of the switch S3 is electrically coupled to the positive terminal of the input voltage source. A second terminal of the switch S3 is electrically coupled to the second terminal of the resonant circuit 140. A first terminal of the switch S4 is electrically coupled to the second terminal of the resonant circuit 140. A second terminal of the switch S4 is electrically coupled to the negative terminal of the input voltage source.

Thus, on the condition that the switches S1, S4 are turned on according to the corresponding driving signals CS1, CS4, and the switches S2, S3 are turned off according to the corresponding driving signals CS2, CS3, the first terminal of the resonant circuit 140 is electrically coupled to the positive terminal of the input voltage source, and the second terminal of the resonant circuit 140 is electrically coupled to the negative terminal of the input voltage source. On the other hand, on the condition that the switches S1, S4 are turned off according to the corresponding driving signals CS1, CS4, and the switches S2, S3 are turned on according to the corresponding driving signals CS2, CS3, the first terminal of the resonant circuit 140 is electrically coupled to the negative terminal of the input voltage source, and the second terminal of the resonant circuit 140 is electrically coupled to the positive terminal of the input voltage source. Therefore, the primary-side switching circuit 120 may switch the switches S1-S4 to be on or off based on the switching frequency so as to convert the DC input voltage Vin to the ac signal with 50% duty cycle that is transmitted to the resonant circuit 140.

In some embodiments, the resonant circuit 140 includes a resonant capacitance unit Cr, a resonant inductance unit Lr, and a magnetic inductance unit Lm. The resonant capacitance unit Cr, the resonant inductance unit Lr, and the magnetic inductance unit Lm are coupled in series, and the magnetic inductance unit Lm and the primary winding Np of the transformer 160 are coupled to each other in parallel. For example, as depicted in FIG. 1, a first terminal of the resonant capacitance unit Cr is electrically coupled to the first terminal of the resonant circuit 140, so as to be electrically coupled to the switches S1, S2. A second terminal of the resonant capacitance unit Cr is electrically coupled to a first terminal of the resonant inductance unit Lr. A second terminal of the resonant inductance unit Lr is electrically coupled to a first terminal of the magnetic inductance unit Lm. A second terminal of the magnetic inductance unit Lm is electrically coupled to the second terminal of the resonant circuit 140, so as to be electrically coupled to the switches S3, S4, but the present disclosure is not limited thereto. In some embodiments, the resonant inductance unit Lr and the magnetic inductance unit Lm may be formed by the leakage inductance and the magnetic inductance of the transformer 160 respectively. In some other embodiments, the resonant capacitance unit Cr, the resonant inductance unit Lr, and the magnetic inductance unit Lm may also be electrically coupled in various ways, so as to construct the LLC resonant circuit.

Therefore, the primary winding Np electrically coupled to the magnetic inductance unit Lm in parallel may be configured to receive the primary ac signal from the resonant circuit 140. The secondary winding Ns may output a secondary ac signal to the secondary-side rectifying circuit 180 in response to the primary ac signal, such that the transformer establishes the power transmission between the primary side and the secondary side.

In various embodiments, the secondary-side rectifying circuit 180 may be implemented by a half bridge, a full bridge, or another type of rectifying circuit. For example, in the embodiment shown in FIG. 1, the secondary-side rectifying circuit 180 may be implemented by a full bridge rectifying circuit. The secondary-side rectifying circuit 180 includes diodes D1, D2, D3, and D4. As depicted in the drawing, an anode of the diode D1 is electrically coupled to the first terminal of the secondary winding Ns, and a cathode of the diode D1 is electrically coupled to the first terminal of the output capacitor Co. An anode of the diode D2 is electrically coupled to the second terminal of the output capacitor Co, and a cathode of the diode D2 is electrically coupled to the anode of the diode D1. An anode of the diode D3 is electrically coupled to the second terminal of the secondary winding Ns, and a cathode of the diode D3 is electrically coupled to the first terminal of the output capacitor Co. An anode of the diode D4 is electrically coupled to the second terminal of the output capacitor Co, and a cathode of the diode D4 is electrically coupled to the anode of the diode D3.

Thus, the secondary-side ac signal induced and outputted by the secondary winding Ns is rectified and filtered by the secondary-side rectifying circuit 180 and the output capacitance Co, and the DC output voltage Vo may be outputted.

Therefore, by using the operations of the aforementioned circuits, the power converter 100 may convert the DC input voltage Vin to the DC output voltage with a proper voltage level that is provided to a post-stage circuit. It is noted that in some embodiments, if the difference between the switching frequency of the switches S1-S4 and the resonant frequency of the resonant circuit 140 is too large, additional loss of the power components is caused, thus lowering the conversion efficiency of the power converter 100. Thus, the processing circuit 150 may be configured to detect the magnitude and changes of the resonant current Ir when or before a corresponding one of the switches S1-S4 is turned off, and to adjust the switching frequency of the switches S1-S4 according to the magnitude of the resonant current Ir when the corresponding switch is turned off, or according to the changes of the resonant current Ir before the corresponding switch is turned off. In the following paragraphs, the detail operation of the processing circuit 150 adjusting the switching frequency of the switches S1-S4 will be discussed in accompany with related drawings in following paragraphs.

Figure 2:
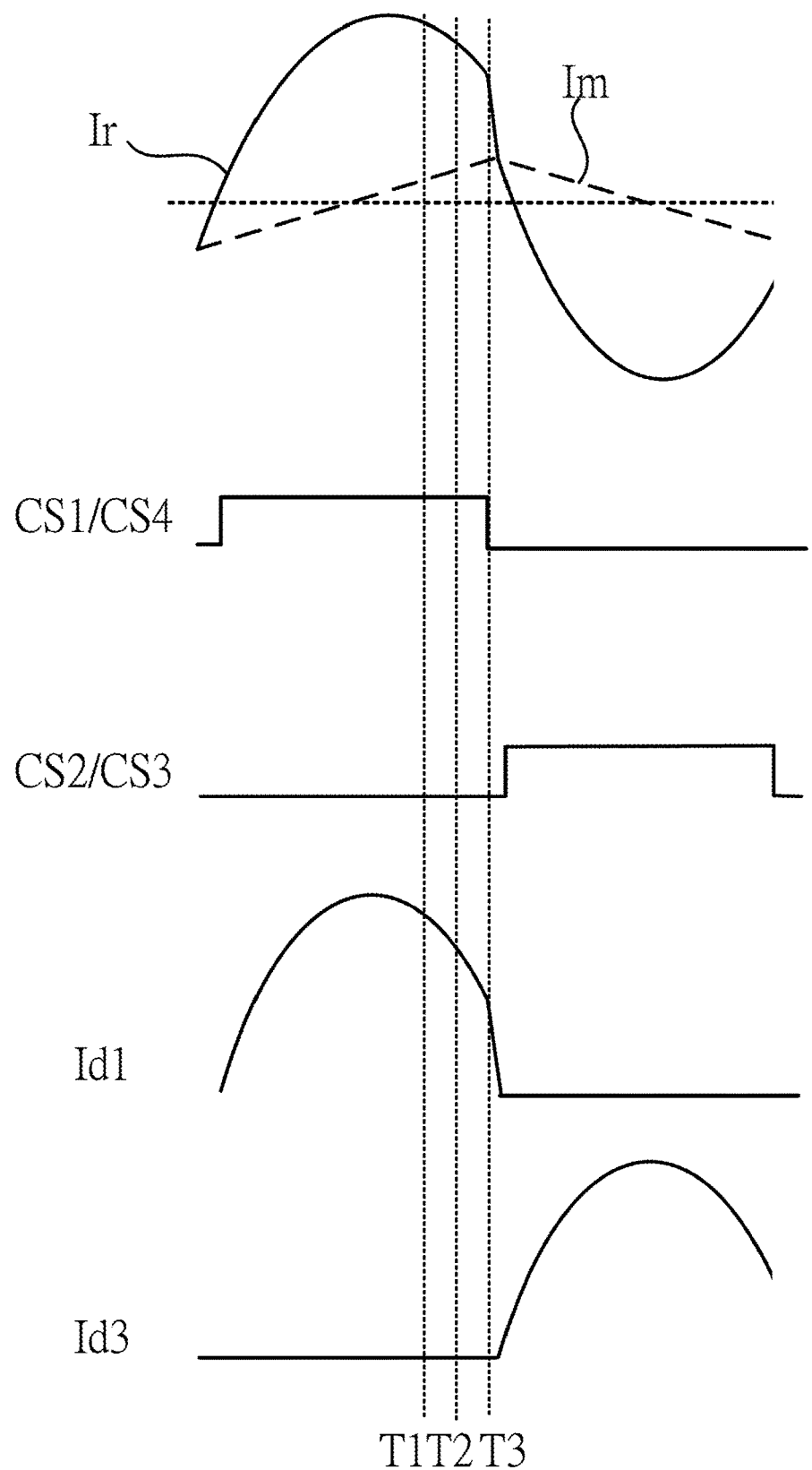
FIG. 2 is a schematic waveform diagram of the power converter operated under an over-resonance mode according to some embodiments of the present disclosure.
Figure 3A:
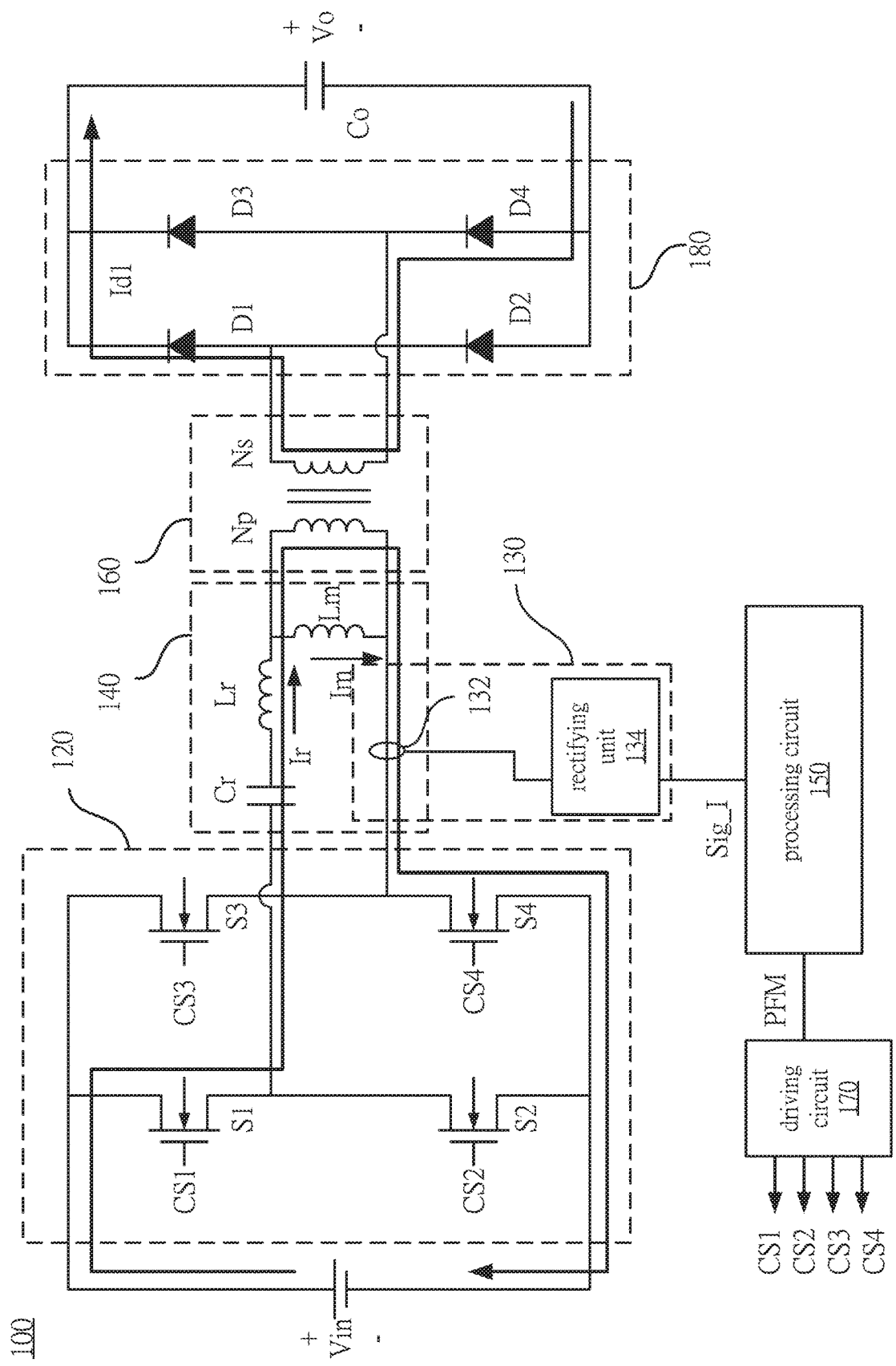
FIG. 3A and FIG. 3B are schematic operating diagrams of the power converter according to some embodiments of the present disclosure.
Figure 3B:
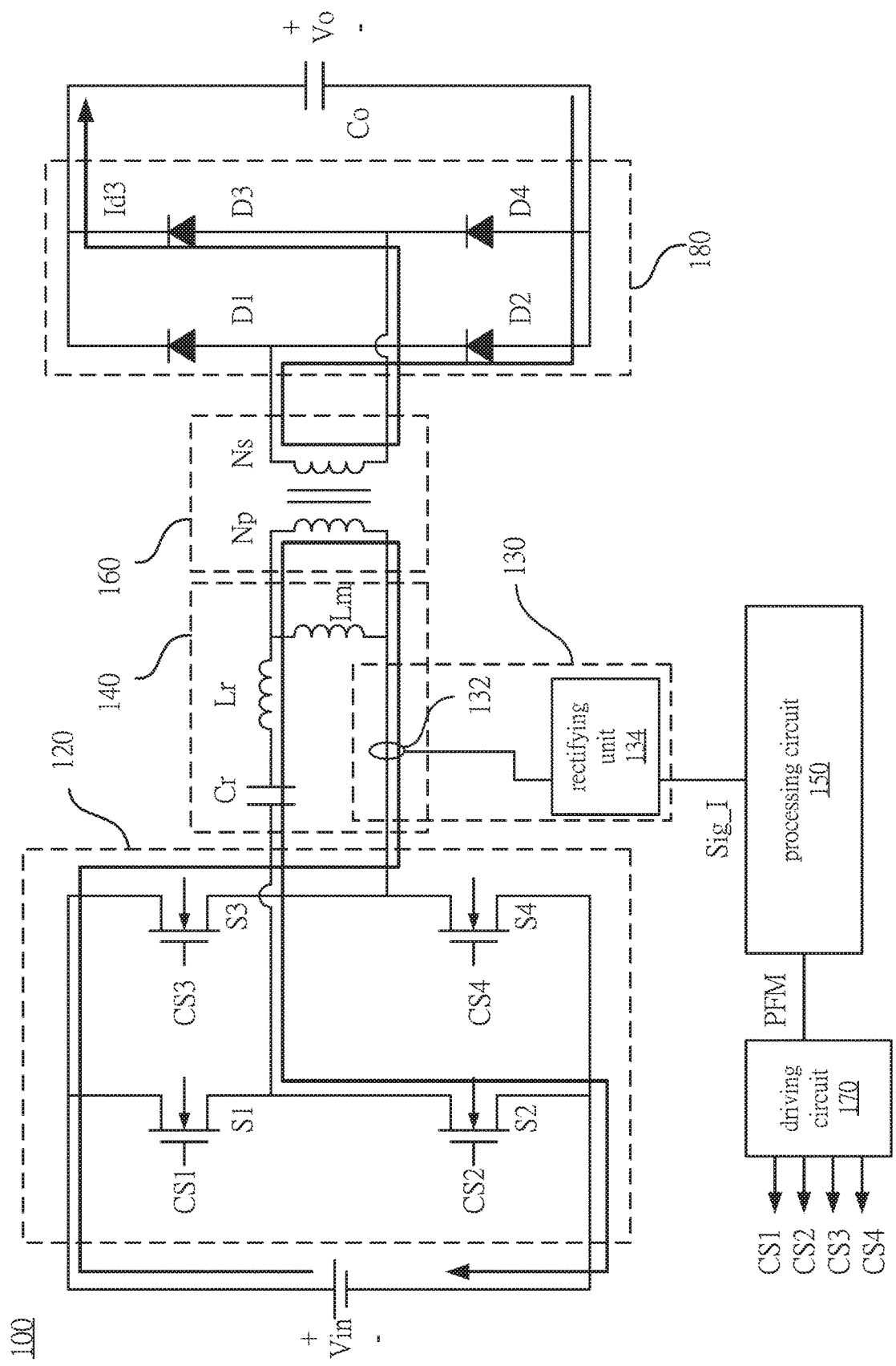

Reference is made to FIG. 2 and FIG. 3A, FIG. 3B. FIG. 2 is a schematic waveform diagram of the power converter 100 operated under an over-resonance mode according to some embodiments of the present disclosure. FIG. 3A and FIG. 3B are schematic operating diagrams illustrating the power converter 100 according to some embodiments of the present disclosure.

As shown in FIG. 3A, in the first half cycle, the switches S1, S4 are turned on. The difference current between the resonant current Ir and the magnetic current Im flows into the primary winding Np, and the power is transmitted to the second winding Ns via the transformer 160, and the current Id1 is outputted via the conducting diodes D1 and D4.

As shown in FIG. 3B, in the second half cycle, the switches S2, S3 are turned on. The direction of the resonant current Ir is reversed from the first half cycle, and polarity of the magnetic inductance unit Lm is reversed. The difference current between the resonant current Ir and the magnetic current Im flows into the primary winding Np, and the power is transmitted to the second winding Ns via the transformer 160, and the current Id3 is outputted via the conducting diodes D2 and D3.

On the condition that the power converter 100 is operated under the over-resonance mode, waveforms of each signal are depicted in FIG. 2. Since the switching frequency of the switches S1-S4 are higher than the resonant frequency of the resonant circuit 140, the control signals CS1, CS4 shift from an enable level (e.g., a high level) to a disable level (e.g., a low level) before the first half cycle of the resonant current is completed, thereby first turning off the switches S1 and S4 to change the resonant current Ir from a sinusoidal waveform to a linearly decreasing waveform. After a short period of dead time, the control signals CS2, CS3 shift from the disable level (e.g., a low level) to the enable level (e.g., a high level), thereby turning on the switches S2 and S3 and entering the second half cycle. Thus, the resonant current Ir is not a complete sinusoidal waveform, and the current Id1, Id3 flowing through the secondary-side rectifying circuit 180 in the first and second half cycles are not complete sinusoidal waveforms either.

Under this mode, the diodes D1-D4 in the secondary-side rectifying circuit 180 are hard switches. If the switching frequency of the switches S1-S4 is too high, large power loss occurs while the switches S1-S4 are turned OFF.

As shown in FIG. 2, since the sinusoidal waveform of the resonant current Ir is interrupted before the corresponding one of the switches S1-S4 is turned off, the resonant current Ir is greater than the magnetic current Im at the time the corresponding one of the switches S1-S4 is turned off. Thus, the processing circuit 150 may estimate the magnetic current Im in the current circuit operation based on a formula, and the magnetic current Im is added with a proper error tolerance value as a first threshold value. If the cut-off current detecting signal Sig_I indicating the resonant current Ir detected at the time point T3 is greater than the first threshold value, the switching frequency of the switches S1-S4 is too high, and thus the sinusoidal waveform is interrupted too early. In this case, the processing circuit 150 may determine that the current switching frequency is too high, and adjust the pulse frequency modulation signal PFM outputted to the driving circuit 170 to reduce the switching frequency.

In addition, in some embodiments, the processing circuit 150 may be configured to detect the changes of the resonant current Ir by using the current detecting circuit 130 before the switches S1-S4 are turned off, and thus to determine whether the switching frequency of the switches S1-S4 exceeds a predetermined operating frequency range, and to output a corresponding pulse frequency modulation signal PFM to reduce the switching frequency of the switches S1-S4.

For example, the processing circuit 150 may be configured to receive a first current detecting signal Sig_I from the current detecting circuit 130 at a first time point T1 before the corresponding switch S1-S4 is turned off, and to receive a second current detecting signal Sig_I from the current detecting circuit 130 at a second time point T2 after the first time point T1. As shown in FIG. 2, while the sinusoidal wave of the resonant current Ir is dropping from the maximum value to zero, the slope increases continuously. If the current detecting signals Sig_I detected at the time points T1 and T2 respectively have a small difference, the switching frequency of the switches S1-S4 is too high, and thus the sinusoidal waveform is interrupted too early. Alternatively stated, on the condition that the first current detecting signal is greater than the second current detecting signal, and a difference between the first current detecting signal and the second current detecting signal is smaller than a third threshold value, the processing circuit 150 may determine that the current switching frequency is too high, and adjust the pulse frequency modulation signal PFM outputted to the driving circuit 170 to reduce the switching frequency.

Figure 4:
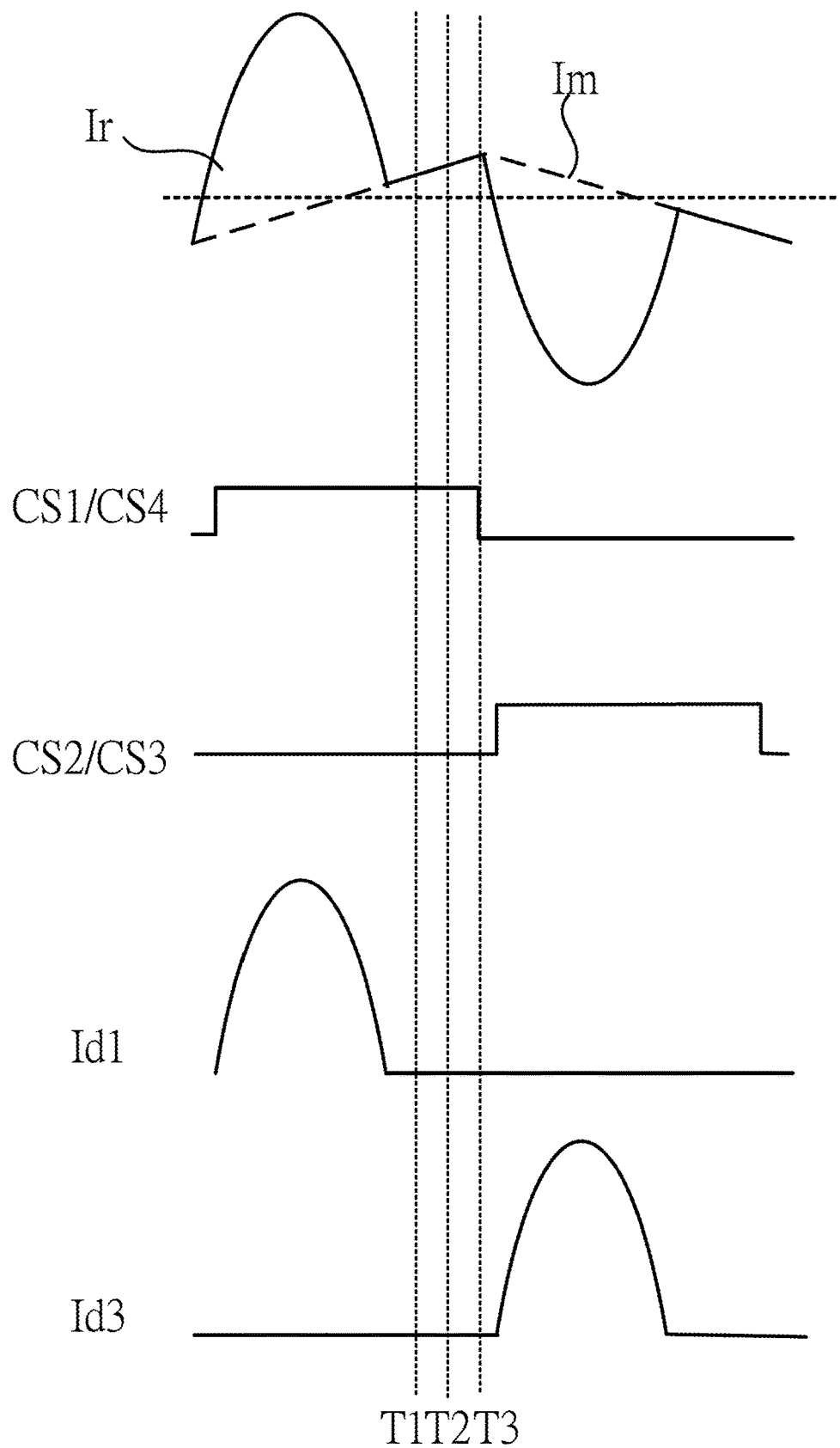
FIG. 4 is a schematic waveform diagram of the power converter operated under an under-resonance mode according to some embodiments of the present disclosure.
Figure 5A:
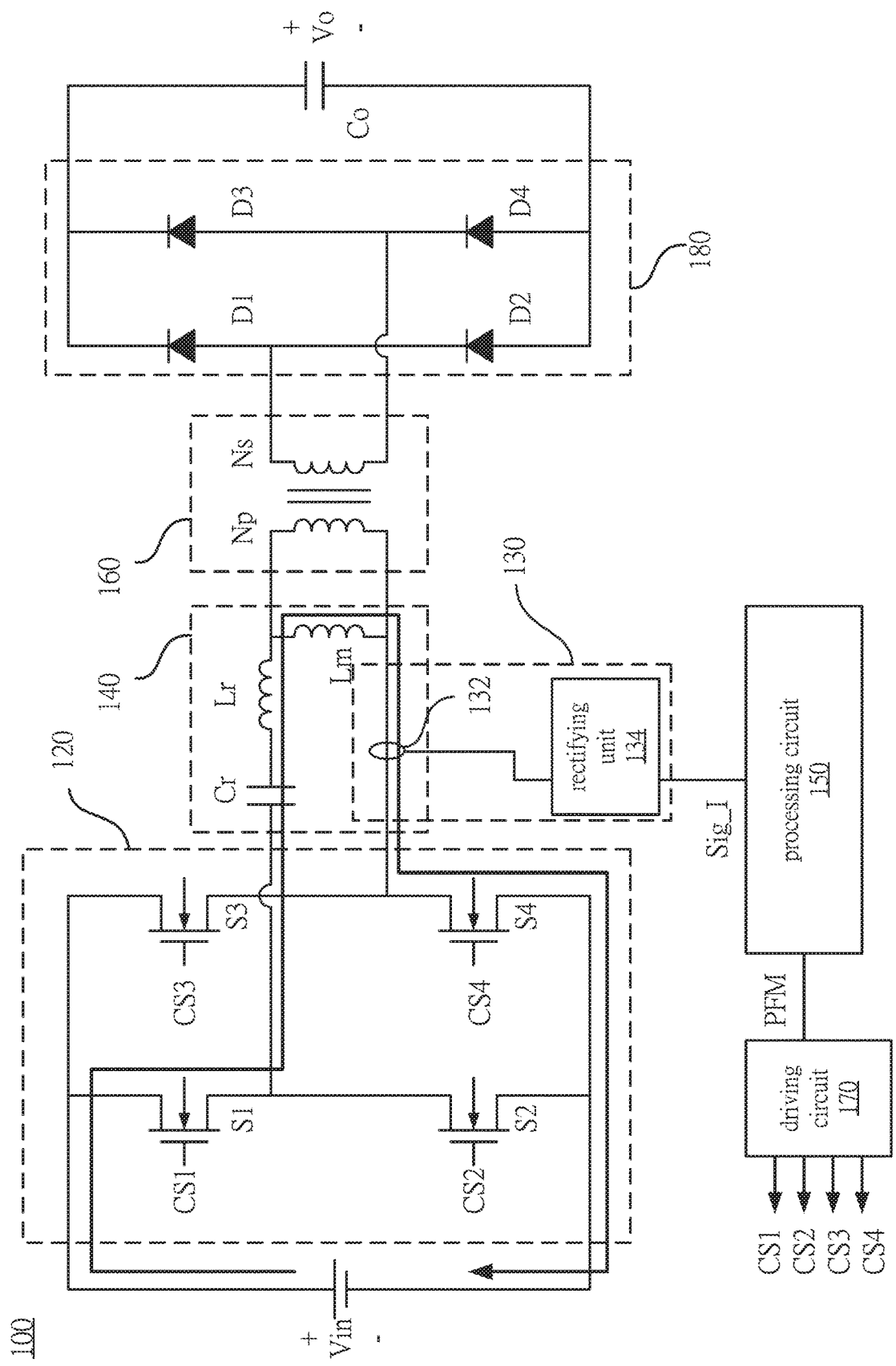
FIG. 5A and FIG. 5B are schematic operating diagrams of the power converter according to some embodiments of the present disclosure.
Figure 5B:
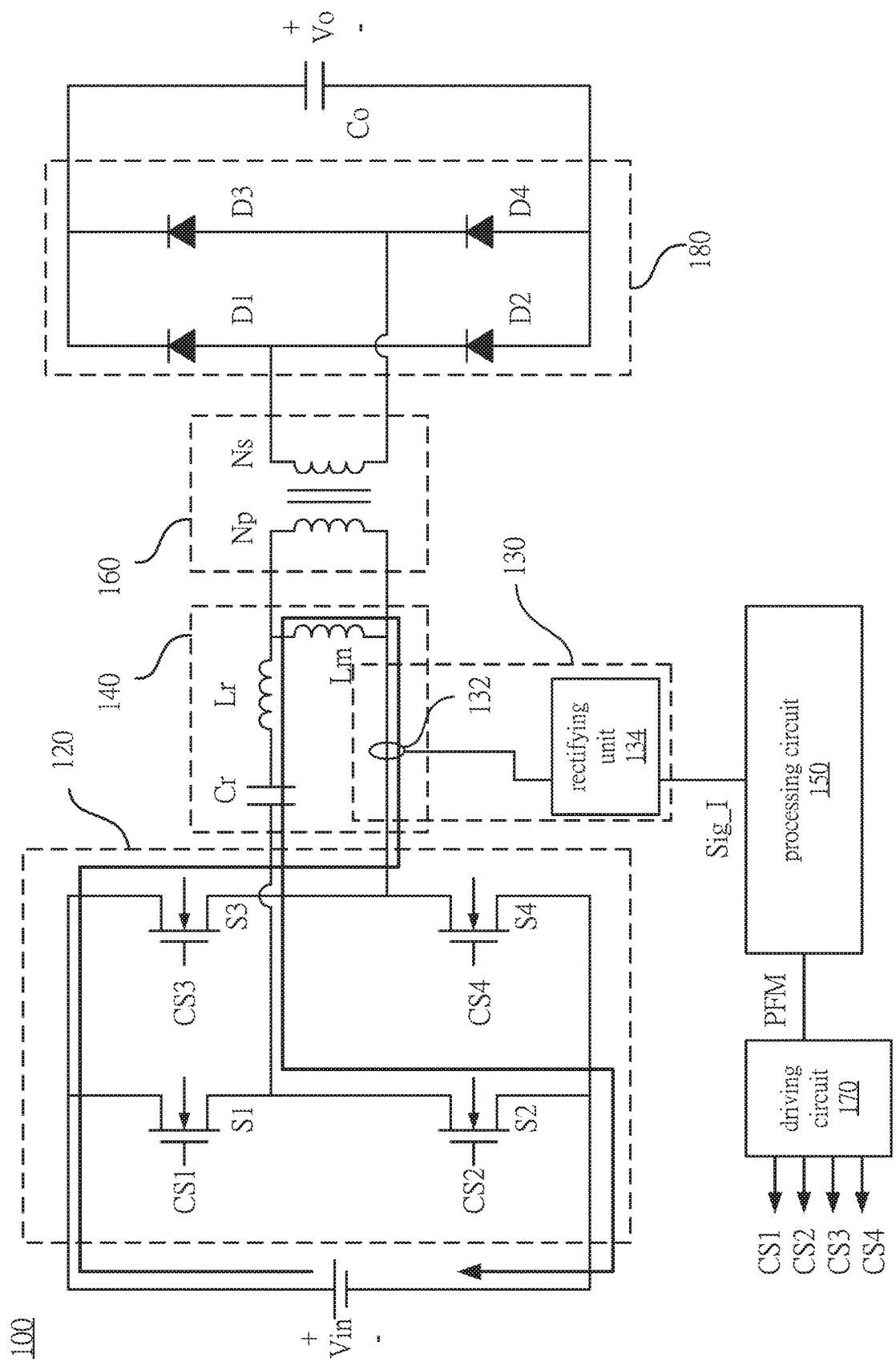

Reference is made to FIG. 4 and FIG. 5A, FIG. 5B. FIG. 4 is a schematic waveform diagram of the power converter 100 operated under an under-resonance mode according to some embodiments of the present disclosure. FIG. 5A and FIG. 5B are schematic operating diagrams illustrating the power converter 100 according to some embodiments of the present disclosure.

On the condition that the power converter 100 is operated under the under-resonance mode, the operation of the power converter before the resonant half cycle is completed is similar to that shown in FIG. 3A and FIG. 3B, and details have been described in the above paragraphs, and thus further explanation is not described again herein for the sake of brevity.

On the other hand, as shown in FIG. 5A, in the first half cycle, after the resonant half cycle is completed, the resonant current Ir is equal to the magnetic current Im, and there is no current flowing though the primary winding Np in this case. The diodes D1-D4 of the secondary-side rectifying circuit 180 do not provide current paths, and the power required by the post-stage circuit is provided by the output capacitor Co.

Similarly, as shown in FIG. 5B, in the second half cycle, after the resonant half cycle is completed, the resonant current Ir is equal to the magnetic current Im, and there is no current flowing though the primary winding Np in this case. The diodes D1-D4 of the secondary-side rectifying circuit 180 do not provide current paths, and the power required by the post-stage circuit is also provided by the output capacitor Co.

On the condition that the power converter 100 is operated under the under-resonance mode, waveforms of each signal are depicted in FIG. 4. Since the switching frequency of the switches S1-S4 are lower than the resonant frequency of the resonant circuit 140, the control signals CS1, CS4 maintain at the enable level (e.g., a high level) on the condition that the first half cycle of the resonant current is completed, and do not shift to the disable level (e.g., a low level) yet. Thus, the waveforms of the resonant current Ir and those of the magnetic current Im coincide and rise gradually until the control signals CS1, CS4 shift to the disable level. The control signals CS2, CS3 shift from the disable level to the enable level after a short period of dead time, and thus the switches S2 and S3 are turned on and the second half cycle is entered. Thus, the currents Id1, Id3 flowing through the secondary-side rectifying circuit 180 in the first and second half cycles include a half-sinusoidal waveform and a period of cut-off time, and the resonant current Ir rises continuously before the corresponding switch S1-S4 is turned off. Under this mode, while the secondary-side rectifying circuit 180 is off, a large conduction loss is caused due to a loop current occurring in the primary-side circuit.

Therefore, when the corresponding switch S1-S4 is turned off, the resonant current Ir is smaller than or equal to the estimating magnetic current Im. Accordingly, the processing circuit 150 may estimate the magnetic current Im in the current circuit operation as a second threshold value based on the formula. If the cut-off current detecting signal Sig_I indicating the resonant current Ir detected at the time T3 is equal to or smaller than the second threshold value, the switching frequency of the switches S1-S4 is too low, and thus the power converter is operated in under-resonance. In this case, the processing circuit 150 may determine that the current switching frequency is too low, and may adjust the pulse frequency modulation signal PFM outputted to the driving circuit 170 to increase the switching frequency.

Alternatively stated, as shown in FIG. 2-FIG. 5A and FIG. 5B, the processing circuit 150 may receive the cut-off current detecting signal Sig_I from the current detecting circuit 130, determine whether the switching frequency is adjusted to the resonant frequency of the resonant circuit 140, and adjust the switching frequency according to the cut-off current detecting signal Sig_I on the condition that the corresponding switch S1-S4 is turned off (e.g., at the time point T3).

In addition, as shown in FIG. 4, since the resonant current Ir rises continuously before the corresponding one of the switches S1-S4 is turned off, the processing circuit 150 may be configured to detect the changes of the resonant current Ir before the switches S1-S4 are turned off by the current detecting circuit 130, and thus to determine whether the switching frequency of the switches S1-S4 is below the predetermined operating frequency range, and to output corresponding pulse frequency modulation signal PFM to increase the switching frequency of the switches S1-S4 by the processing circuit 150.

Similarly, the processing circuit 150 may be configured to receive the first current detecting signal Sig_I from the current detecting circuit 130 at the first time point T1 before the corresponding switch S1-S4 is turned off, and to receive a second current detecting signal Sig_I from the current detecting circuit 130 at a second time point T2 after the first time point T1. On the condition that the second current detecting signal is greater than the first current detecting signal, and a difference between the first current detecting signal and the second current detecting signal is greater than a fourth threshold value, the processing circuit 150 may determine that the resonant current Ir rises continuously and the power converter 100 is operated under the under-resonance mode and the switching frequency is too low, and may adjust the pulse frequency modulation signal PFM outputted to the driving circuit 170 to increase the switching frequency.

In sum, by detecting the changes of the primary-side resonant current Ir before the corresponding one of the switches S1-S4 is turned off, the processing circuit 150 may selectively increase or reduce the switching frequency according to the first current detecting signal Sig_I and the second current detecting signal Sig_I, such that the switches S1-S4 in the primary-side switching circuit is operated near the resonant frequency in order to prevent high overall power loss and low conversion efficiency of the power converter 100 due to too high or too low switching frequency.

Figure 6:
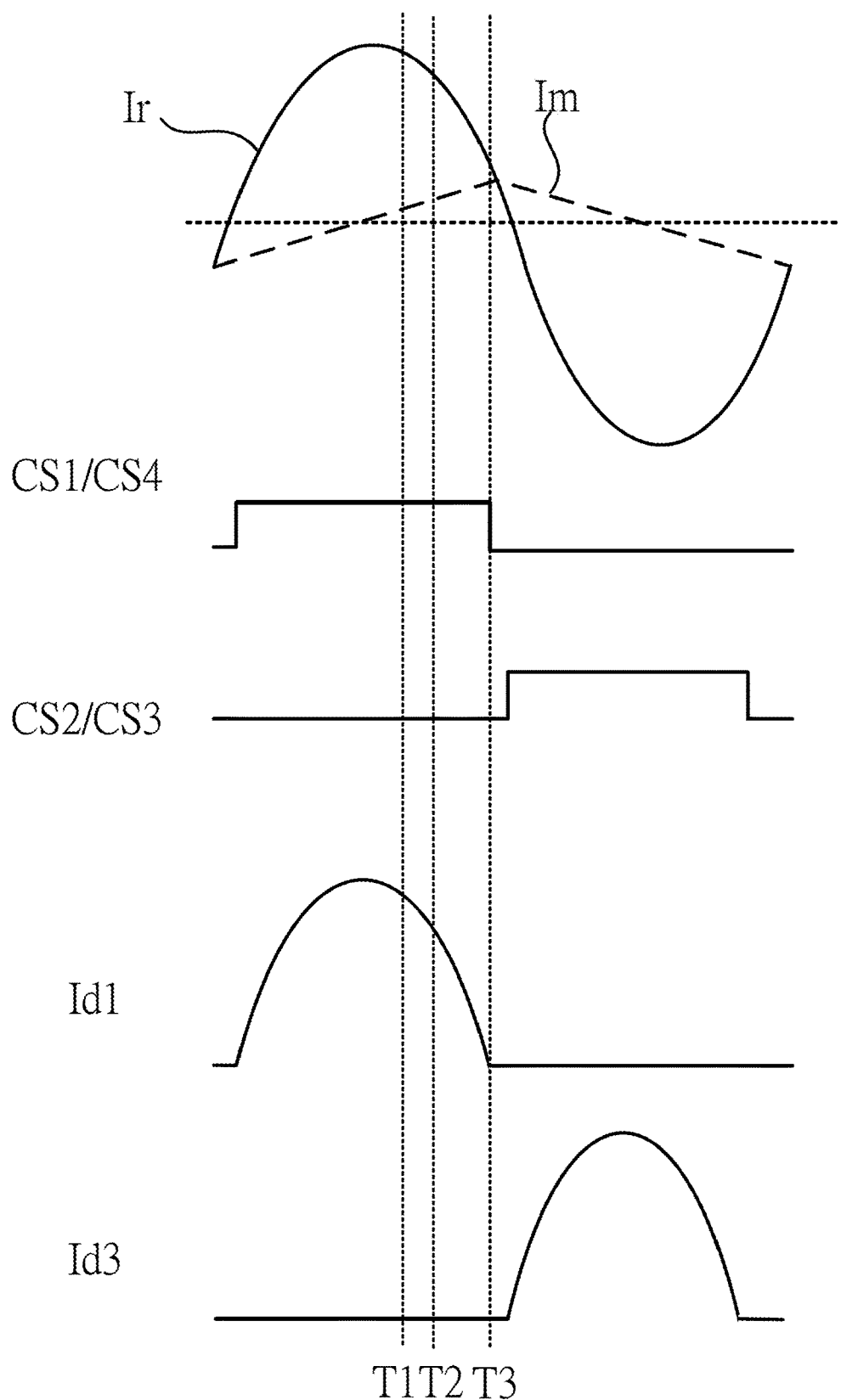
FIG. 6 is a schematic waveform diagram of the power converter operated under a complete resonant mode according to some embodiments of the present disclosure.

Reference is made to FIG. 6. FIG. 6 is a schematic waveform diagram of the power converter 100 operated under a complete resonant mode according to some embodiments of the present disclosure. As shown in FIG. 6, if the switching frequency is close to or equal to the resonant frequency, a complete resonant half cycle is included in each of the first half cycle and the second half cycle. On the condition that the switches S1-S4 are switched, the resonant current Ir is about equal to the magnetic current Im, and the currents Id1, Id3 outputted by the secondary-side rectifying circuit 180 are reduced to about zero. Under such conditions, the power converter 100 has the highest efficiency.

In some embodiments, the processing circuit 150 is further configured to receive the cut-off current detecting signal Sig_I from the current detecting circuit 130 on the condition that the corresponding one of the switches S1-S4 is off (e.g., at time T3), and to determine whether the switching frequency is adjusted to the resonant frequency of the resonant circuit 140 according to the cut-off current detecting signal.

As shown in FIG. 6, if the power converter 100 is operated under the complete resonant mode, while the switches S1-S4 are being switched, the resonant current Ir is about equal to the magnetic current Im. Accordingly, the processing circuit 150 may estimate the target value of the magnetic current Im based on the parameters of the elements, and compare the target value with the detected cut-off current detecting signal Sig_I. If the values are close to each other, the processing circuit 150 may determine that the switching frequency of the primary-side switching circuit 120 is adjusted to a frequency that is close to the resonant frequency of the resonant circuit 140, and then stop adjusting the outputted pulse frequency modulation signal PFM. Thus, the power converter 100 may complete the frequency control.

In sum, by detecting the magnitude of the resonant current Ir in each switching cycles on the condition that the switches S1-S4 are turned off, or the changes of the resonant current Ir before the switches S1-S4 are turned off, the switching frequency may be gradually increased or reduced until the processing circuit 150 determines that the switching frequency falls within the targeted operating region which is close to or about equal to the resonant frequency, according to the detected resonant current Ir.

In addition, since only the resonant current Ir at the primary-side is required to be detected in this frequency control operation, no feedback detection signal is required from the secondary-side, and no additional isolation circuit is required to be arranged between the primary-side and the secondary-side to perform signal transmission, and thus the design of the control circuit may be simplified and the cost may be reduced.

Figure 7:
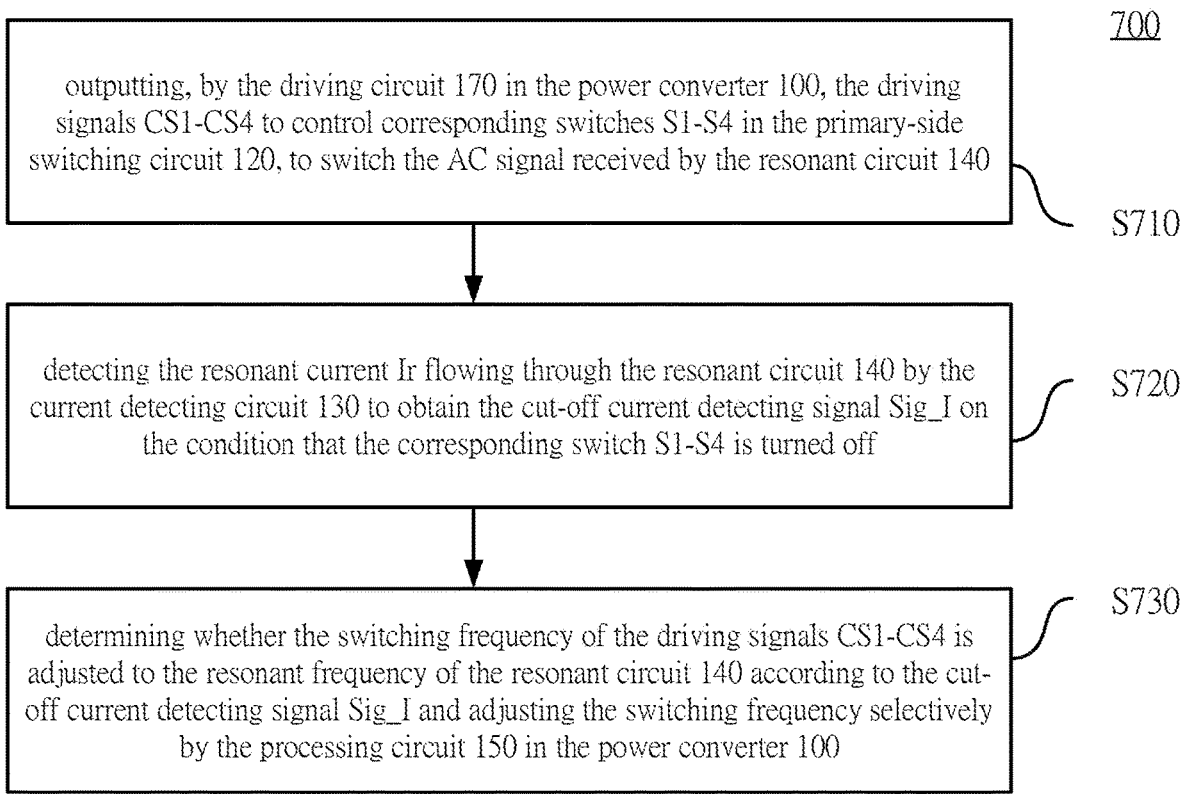
FIG. 7 and FIG. 8 are flowcharts illustrating control methods of the power converter according to some embodiments of the present disclosure.
Figure 8:
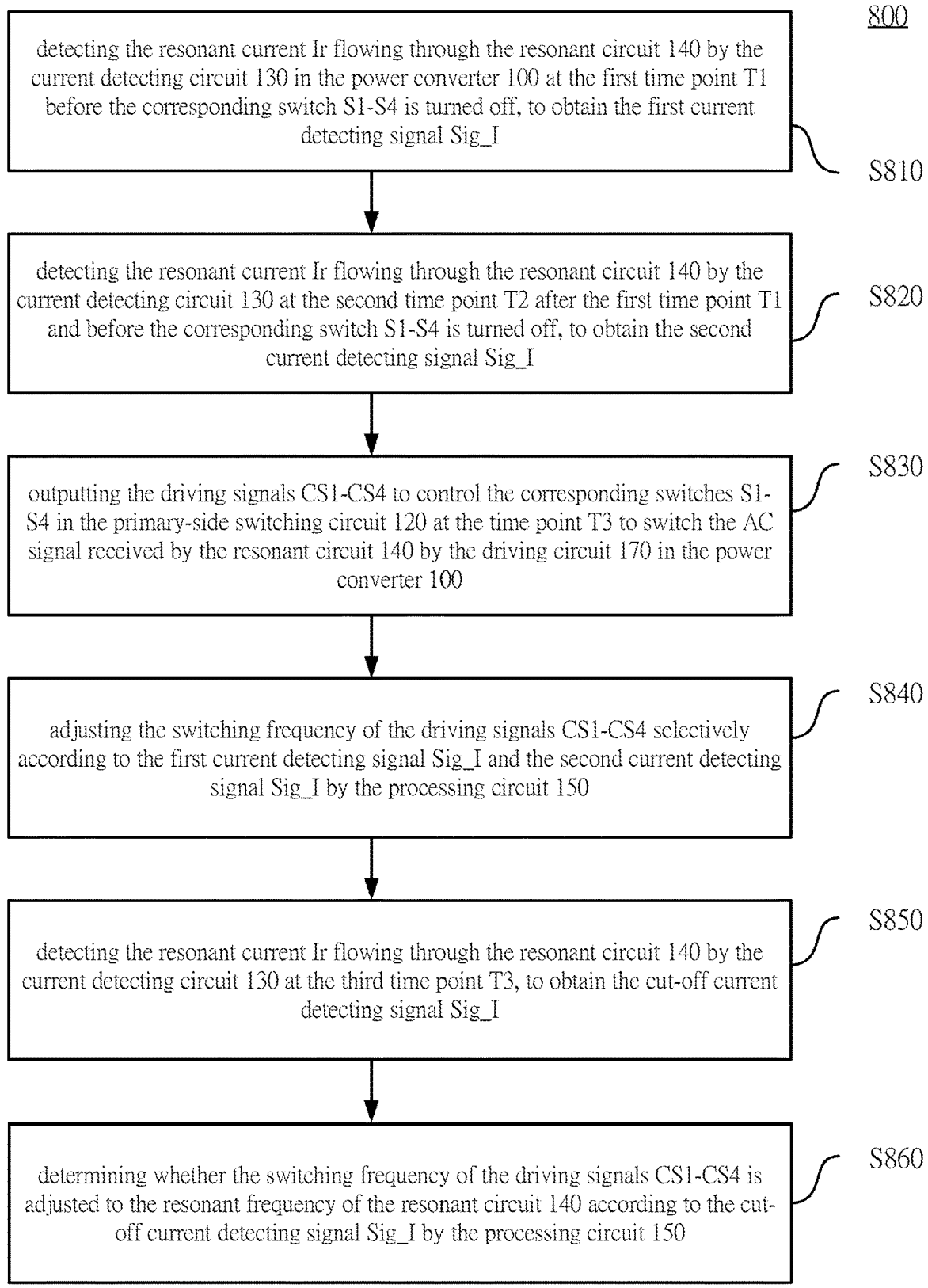

Reference is made to FIG. 7 and FIG. 8. FIG. 7 and FIG. 8 are flowcharts illustrating the control methods 700 and 800 of the power converter 100 according to some embodiments of the present disclosure. For better understanding the present disclosure, the following control methods 700 and 800 are discussed in accompany with embodiments illustrated in FIG. 1-FIG. 6, but the present disclosure is not limited thereto. It will be apparent to those skilled in the art that various modifications and variations can be made without departing from the scope or spirit of the disclosure. As shown in FIG. 7, the control method 700 includes steps S710, S720, and S730.

First, in step S710, the power converter 100 is configured to output the driving signals CS1-CS4 to control corresponding switches S1-S4 in the primary-side switching circuit 120 by using the driving circuit 170 in the power converter 100, and to switch the AC signal received by using the resonant circuit 140 in the power converter 100.

Next, in step 720, the power converter 100 is configured to detect the resonant current Ir flowing through the resonant circuit 140 by using the current detecting circuit 130 to obtain the cut-off current detecting signal Sig_I on the condition that the corresponding switch S1-S4 is turned off.

Next, in step S730, the power converter 100 is configured to determine whether the switching frequency of the driving signals CS1-CS4 is adjusted to the resonant frequency of the resonant circuit 140 by using the processing circuit 150 in the power converter 100 according to the cut-off current detecting signal Sig_I and to selectively adjust the switching frequency.

Specifically, in some embodiments, the power converter 100 is configured to reduce the switching frequency by using the processing circuit 150 on the condition that the cut-off current detecting signal Sig_I is greater than the first threshold value. The power converter 100 is configured to increase the switching frequency by using the processing circuit 150 on the condition that the cut-off current detecting signal Sig_I is smaller than or equal to the second threshold value.

In some embodiments, the power converter 100 may further be configured to adjust the switching frequency by adjusting the changes of the resonant current Ir before the switch is turned off. As shown in FIG. 8, the control method 800 includes steps S810, S820, S830, S840, S850, and S860.

First, in step S810, the power converter 100 is configured to detect the resonant current Ir flowing through the resonant circuit 140 by using the current detecting circuit 130 at the first time T1 point before the corresponding switch S1-S4 is turned off, so as to obtain the first current detecting signal Sig_I.

Next, in step S820, the power converter 100 is configured to detect the resonant current Ir flowing through the resonant circuit 140 by using the current detecting circuit 130 at the second time point T2 after the first time point T1 and before the corresponding switch S1-S4 is turned off, so as to obtain the second current detecting signal Sig_I.

Next, in step S830, the power converter 100 is configured to output the driving signals CS1-CS4 to control the corresponding switches S1-S4 in the primary-side switching circuit 120 by the driving circuit 170 in the power converter 100 at the time point T3, so as to switch the AC signal received by the resonant circuit 140.

Next, in step S840, the power converter 100 is configured to selectively adjust the switching frequency of the driving signals CS1-CS4 by using the processing circuit 150 according to the first current detecting signal Sig_I and the second current detecting signal Sig_I.

Specifically, in some embodiments, the processing circuit 150 is configured to increase the switching frequency in step S840 on the condition that the second current detecting signal Sig_I is greater than the first current detecting signal Sig_I, and the difference between the first current detecting signal Sig_I and the second current detecting signal Sig_I is greater than the third threshold value.

On the other hand, the processing circuit 150 is configured to reduce the switching frequency in the step S840 on the condition that the first current detecting signal Sig_I is greater than the second current detecting signal Sig_I, and the difference between the first current detecting signal Sig_I and the second current detecting signal Sig_I is smaller than the fourth threshold value.

In some embodiments, the step of adjusting the switching frequency of the driving signals CS1-CS4 includes calculating and outputting the pulse frequency modulation signal PFM by using the processing circuit 150 according to the first current detecting signal Sig_I and the second current detecting signal Sig_I; and receiving the pulse frequency modulation signal PFM by using the driving circuit 170, and outputting the driving signals CS1-CS4 according to the pulse frequency modulation signal PFM, so as to adjust the switching frequency of the driving signals CS1-CS4.

Next, in step S850, the power converter 100 is configured to detect the resonant current Ir flowing through the resonant circuit 140 by using the current detecting circuit 130 at the third time point T3, so as to obtain the cut-off current detecting signal Sig_I.

Thereafter, in step S860, the power converter 100 is configured to determine whether the switching frequency of the driving signals CS1-CS4 is adjusted to the resonant frequency of the resonant circuit 140 by using the processing circuit 150 according to the cut-off current detecting signal Sig_I.

Those skilled in the art can immediately understand how to perform the operations and functions of the control methods 700 and 800 based on the power converter 100 in the aforementioned embodiments, and thus a further explanation is not described again herein for the sake of brevity.

The above description includes exemplary operations, but the operations are not necessarily performed in the order described. The order of the operations disclosed in the present disclosure may be changed, or the operations may even be executed simultaneously or partially simultaneously as appropriate, in accordance with the spirit and scope of various embodiments of the present disclosure.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power converter, comprising:
a primary-side switching circuit comprising a plurality of switches, wherein the primary-side switching circuit is configured to switch the plurality of switches to be on or off based on a switching frequency to convert a dc input voltage to an ac signal;
a resonant circuit electrically coupled to the primary-side switching circuit and configured to receive the ac signal to provide a resonant current;
a transformer, wherein a primary winding of the transformer is electrically coupled to the resonant circuit;
a secondary-side rectifying circuit electrically coupled to a secondary winding of the transformer and configured to rectify a secondary ac signal outputted by the secondary winding and to output an output voltage; and
a processing circuit configured to receive a cut-off current detecting signal via a current detecting circuit on a condition that a corresponding switch in the primary-side switching circuit is turned off, and configured to adjust the switching frequency accordingly, wherein the current detecting circuit detects the resonant current to generate the cut-off current detecting signal,
wherein the processing circuit is configured to reduce the switching frequency on a condition that the cut-off current detecting signal is greater than a first threshold value, and the processing circuit is configured to increase the switching frequency on a condition that the cut-off current detecting signal is smaller than a second threshold value.

2. The power converter of claim 1, wherein the processing circuit is further configured to detect changes of the resonant current via the current detecting circuit and adjust the switching frequency according to changes of the resonant current before the corresponding switch is turned off.

3. The power converter of claim 2, wherein the processing circuit is configured to receive a first current detecting signal from the current detecting circuit at a first time before the corresponding switch is turned off, and to receive a second current detecting signal from the current detecting circuit at a second time after the first time, in order to selectively increase or reduce the switching frequency according to the first current detecting signal and the second current detecting signal.

4. The power converter of claim 3, wherein the processing circuit is configured to increase the switching frequency on a condition that the second current detecting signal is greater than the first current detecting signal, and a difference between the first current detecting signal and the second current detecting signal is greater than a threshold value.

5. The power converter of claim 3, wherein the processing circuit is configured to reduce the switching frequency on a condition that the first current detecting signal is greater than the second current detecting signal, and a difference between the first current detecting signal and the second current detecting signal is smaller than a threshold value.

6. The power converter of claim 1, further comprising a driving circuit, wherein the driving circuit is electrically coupled to the processing circuit and the plurality of switches in the primary-side switching circuit, the processing circuit is configured to calculate and output a pulse frequency modulation signal according to the cut-off current detecting signal, and the driving circuit is configured to output a plurality of driving signals to the plurality of switches respectively according to the pulse frequency modulation signal, so as to switch the plurality of switches to be on or off according to the switching frequency.

7. A power converter, comprising:
 a primary-side switching circuit, comprising a plurality of switches and the plurality of switches are configured to be turned on or off selectively according to a plurality of driving signals respectively to convert a dc input voltage to an ac signal;
 a resonant circuit configured to receive the ac signal to provide a resonant current;
 a current detecting circuit configured to detect the resonant current and output a current detecting signal according to the resonant current;
 a transformer, comprising:
 a primary winding configured to receive a primary ac signal from the resonant circuit;
 a secondary winding configured to output a secondary ac signal in response to the primary ac signal;
 a secondary-side rectifying circuit, configured to rectify the secondary ac signal and output an output voltage; and
 a processing circuit configured to control a switching frequency of the plurality of driving signals according to the current detecting signal on a condition that a corresponding switch is turned off by one of the plurality of driving signals,
 wherein the processing circuit is configured to receive a cut-off current detecting signal from the current detecting circuit if the corresponding switch in the primary-side switching circuit is turned off, to reduce the switching frequency on a condition that the cut-off current detecting signal is greater than a first threshold value, and to increase the switching frequency on a condition that the cut-off current detecting signal is smaller than or equal to a second threshold value.

8. The power converter of claim 7, wherein the processing circuit is further configured to receive a first current detecting signal from the current detecting circuit at a first time point before the corresponding switch is turned off, and to receive a second current detecting signal from the current detecting circuit at a second time point after the first time point, in order to selectively increase or reduce the switching frequency according to the first current detecting signal and the second current detecting signal.

9. The power converter of claim 8, wherein the processing circuit is configured to increase the switching frequency on a condition that the second current detecting signal is greater than the first current detecting signal, and a difference between the first current detecting signal and the second current detecting signal is greater than a first threshold value, and to reduce the switching frequency on a condition that the first current detecting signal is greater than the second current detecting signal, and a difference between the first current detecting signal and the second current detecting signal is smaller than a second threshold value.

10. The power converter of claim 7, wherein the processing circuit is further configured to determine whether the switching frequency is adjusted to a resonant frequency of the resonant circuit according to the current detecting signal on the condition that the corresponding switch is turned off.

11. The power converter of claim 7, further comprising:
 a driving circuit electrically coupled to the processing circuit and the plurality of switches in the primary-side switching circuit; and
 wherein the processing circuit is configured to calculate and output a pulse frequency modulation signal according to the current detecting signal, and the driving circuit is configured to output the driving signals to the plurality of switches according to the pulse frequency modulation signal.

12. The power converter of claim 7, wherein the resonant circuit comprises a resonant capacitance unit, a resonant inductance unit and a magnetic inductance unit electrically coupled to each other in series, wherein the magnetic inductance unit is electrically coupled in parallel to the primary winding.

13. The power converter of claim 7, wherein the plurality of switches comprises:
 a first switch, wherein a first terminal of the first switch is electrically coupled to a positive terminal of an input voltage source, and a second terminal of the first switch is electrically coupled to a first terminal of the resonant circuit;
 a second switch, wherein a first terminal of the second switch is electrically coupled to the first terminal of the resonant circuit, and a second terminal of the second switch is electrically coupled to a negative terminal of the input voltage source;
 a third switch, wherein a first terminal of the third switch is electrically coupled to the positive terminal of the input voltage source, and a second terminal of the third switch is electrically coupled to a second terminal of the resonant circuit; and
 a fourth switch, wherein a first terminal of the fourth switch is electrically coupled to the second terminal of the resonant circuit, and a second terminal of the fourth switch is electrically coupled to the negative terminal of the input voltage source.

14. The power converter of claim 7, wherein the secondary-side rectifying circuit comprises:
 a first diode, wherein an anode of the first diode is electrically coupled to a first terminal of the secondary winding, and a cathode of the first diode is electrically coupled to a first terminal of an output capacitor;
 a second diode, wherein an anode of the second diode is electrically coupled to a second terminal of the output capacitor, and a cathode of the second diode is electrically coupled to the anode of the first diode;
 a third diode, wherein an anode of the third diode is electrically coupled to a second terminal of the secondary winding, and a cathode of the third diode is electrically coupled to the first terminal of the output capacitor; and
 a fourth diode, wherein an anode of the fourth diode is electrically coupled to the second terminal of the output capacitor, and a cathode of the fourth diode is electrically coupled to the anode of the third diode.

15. A power converter controlling method, comprising:
outputting, by a driving circuit in a power converter, a driving signal to control a corresponding switch in a primary-side switching circuit to switch an ac signal received by a resonant circuit in the power converter;
detecting, by a current detecting circuit in the power converter, a resonant current flowing through the resonant circuit in the power converter to obtain a cut-off current detecting signal on a condition that the corresponding switch in the primary-side switching circuit is turned off; and
determining, by a processing circuit in the power converter, whether a switching frequency of the driving signal is adjusted to a resonant frequency of the resonant circuit according to the cut-off current detecting signal, and selectively adjusting, by the processing circuit in the power converter, the switching frequency, wherein adjusting the switching frequency of the driving signal comprises:
reducing, by the processing circuit, the switching frequency on a condition that the cut-off current detecting signal is greater than a first threshold value; and
increasing, by the processing circuit, the switching frequency on a condition that the cut-off current detecting signal is smaller than or equal to a second threshold value.

16. The power converter controlling method of claim 15, further comprising:

detecting, by the current detecting circuit, the resonant current at a first time point before the corresponding switch is turned off, to obtain a first current detecting signal;
detecting, by the current detecting circuit, the resonant current at a second time point after the first time point and before the corresponding switch is turned off, to obtain a second current detecting signal; and
adjusting, by the processing circuit, the switching frequency of the driving signal selectively according to the first current detecting signal and the second current detecting signal.

17. The power converter controlling method of claim 16, wherein adjusting the switching frequency of the driving signal comprises:
increasing, by the processing circuit, the switching frequency on a condition that the second current detecting signal is greater than the first current detecting signal, and a difference between the first current detecting signal and the second current detecting signal is greater than a third threshold value; and
reducing, by the processing circuit, the switching frequency on a condition that the first current detecting signal is greater than the second current detecting signal, and a difference between the first current detecting signal and the second current detecting signal is smaller than a fourth threshold value.

* * * * *